(12) United States Patent
Shao et al.

(10) Patent No.: US 11,451,145 B2
(45) Date of Patent: Sep. 20, 2022

(54) TRANS-INDUCTOR VOLTAGE REGULATOR WITH NONLINEAR COMPENSATION INDUCTOR

(71) Applicant: MONOLITHIC POWER SYSTEMS, INC., San Jose, CA (US)

(72) Inventors: Hang Shao, San Jose, CA (US); Dianbo Fu, San Jose, CA (US); Daocheng Huang, Santa Clara, CA (US); Tao Zhao, San Jose, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 0 days.

(21) Appl. No.: 17/141,528

(22) Filed: Jan. 5, 2021

(65) Prior Publication Data
US 2022/0216793 A1 Jul. 7, 2022

(51) Int. Cl.
*H02M 3/158* (2006.01)
*H02M 3/156* (2006.01)

(52) U.S. Cl.
CPC ....... *H02M 3/1566* (2021.05); *H02M 3/1584* (2013.01); *H02M 3/1586* (2021.05)

(58) Field of Classification Search
CPC . H02M 3/1552; H02M 3/1566; H02M 3/1584
See application file for complete search history.

(56) References Cited

U.S. PATENT DOCUMENTS

| | | | |
|---|---|---|---|
| 7,791,321 B2 | 9/2010 | Xu et al. | |
| 8,836,463 B2 | 9/2014 | Ikriannikov et al. | |
| 10,826,392 B2 | 11/2020 | Liang et al. | |
| 10,831,219 B2 | 11/2020 | Tomioka et al. | |
| 10,831,220 B2 | 11/2020 | Rosolowski et al. | |
| 10,831,221 B1 | 11/2020 | Tesch | |
| 10,845,833 B1 | 11/2020 | Dietrich et al. | |
| 10,845,835 B1 | 11/2020 | Lai et al. | |
| 10,847,193 B2 | 11/2020 | Hollis | |
| 10,852,757 B2 | 12/2020 | Dayley et al. | |
| 10,855,185 B2 | 12/2020 | Song et al. | |
| 2009/0237197 A1* | 9/2009 | Ikriannikov | H01F 27/24 336/212 |
| 2012/0300500 A1* | 11/2012 | Ikriannikov | H01F 30/06 363/16 |
| 2017/0248996 A1* | 8/2017 | Zhang | G06F 1/26 |

OTHER PUBLICATIONS

Fast multi-phase trans-inductor voltage regulator, May 9, 2019, Technical Disclosure Commons (Year: 2019).*

* cited by examiner

*Primary Examiner* — Alex Torres-Rivera
(74) *Attorney, Agent, or Firm* — Beyer Law Group LLP

(57) ABSTRACT

A trans-inductor voltage regulator (TLVR) circuit has multiple phases and a regulator block for each phase. Each regulator block has a winding of a transformer as an output inductor. The other windings of the transformers are connected in series with a nonlinear compensation inductor. The compensation inductor has a large inductance when the compensation inductor current is responsive to a steady state load current and has a small inductance when the compensation inductor current is responsive to a transient load current.

11 Claims, 6 Drawing Sheets

TRANS-INDUCTOR VOLTAGE REGULATOR WITH NONLINEAR COMPENSATION INDUCTOR

BACKGROUND OF THE INVENTION

1. Field of the Invention

The present invention relates generally to electrical circuits, and more particularly but not exclusively to trans-inductor voltage regulators.

2. Description of the Background Art

A trans-inductor voltage regulator (TLVR) is a type of voltage regulator that uses a winding of a transformer as an output inductor. In a multiphase TLVR circuit, a winding of a transformer is employed as an output inductor of a phase, and the other windings of the transformers of all the phases are connected in a series loop to ground. Because of the series connection of the other windings, all of the phases are able to respond to a change in load current, allowing for a faster transient response compared to conventional voltage regulators.

Embodiments of the present invention pertain to a TLVR circuit with a nonlinear compensation inductor.

SUMMARY

In one embodiment, a trans-inductor voltage regulator (TLVR) circuit has multiple phases and a regulator block for each phase. Each regulator block has a winding of a transformer as an output inductor. The other windings of the transformers are connected in series with a nonlinear compensation inductor. The compensation inductor has a large inductance when the compensation inductor current is responsive to a steady state load current and has a small inductance when the compensation inductor current is responsive to a transient load current.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
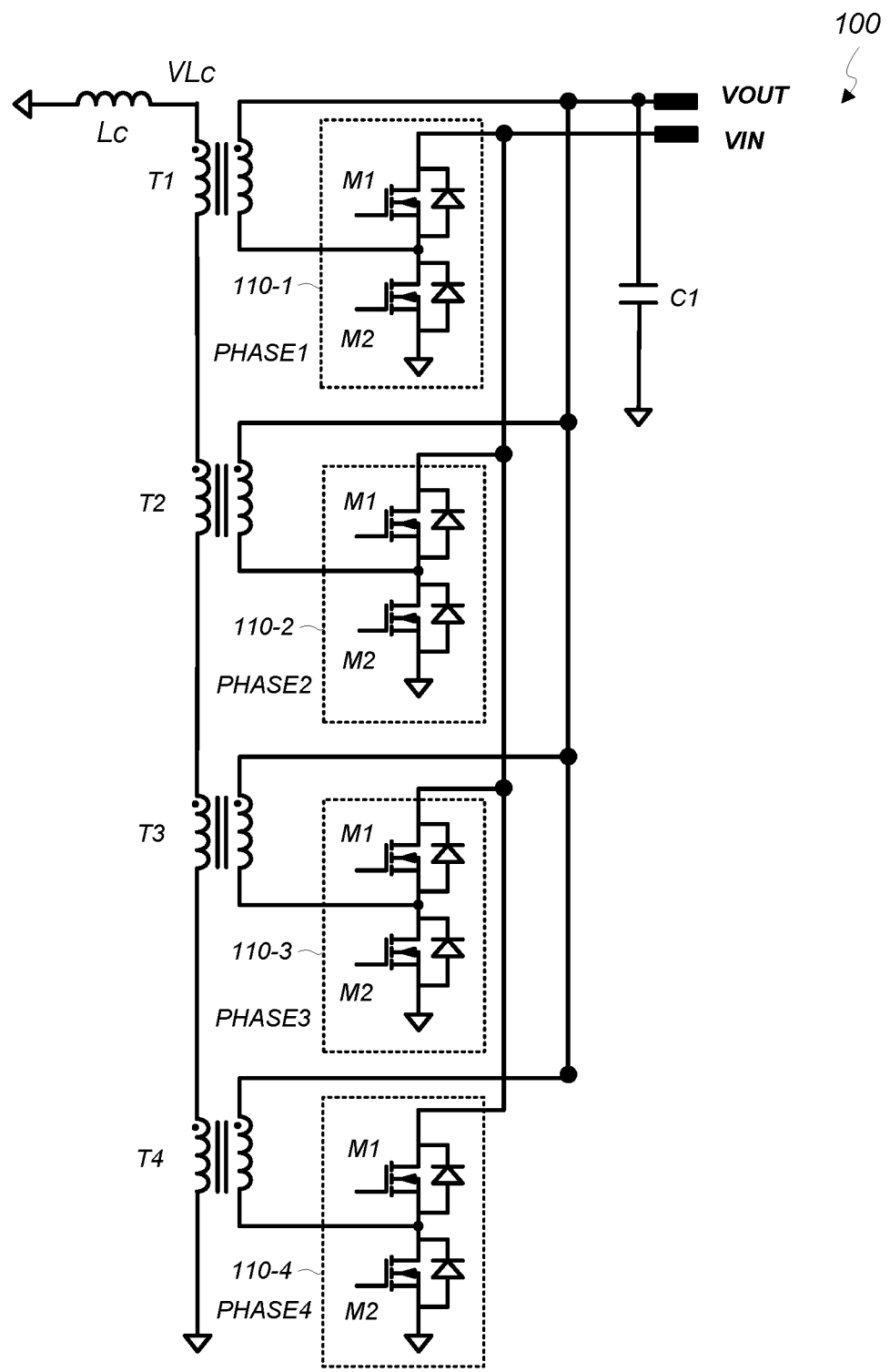
FIG. 1 shows a schematic diagram of a trans-inductor voltage regulator (TLVR) circuit in accordance with an embodiment of the present invention.

FIG. 1 shows a schematic diagram of a TLVR circuit 100 in accordance with an embodiment of the present invention. In the example of FIG. 1, the TLVR circuit 100 is a multiphase TLVR with four phases. As can be appreciated, the TLVR circuit 100 may also be implemented with fewer or more phases.

In the example of FIG. 1, the TLVR circuit 100 comprises a plurality of regulator blocks 110 (i.e., 110-1, 110-2, . . . ), one for each phase. The regulator blocks 110-1, 110-2, 110-3, and 110-4 are for phase 1, phase 2, phase 3, and phase 4, respectively. A regulator block 110 may be a buck regulator comprising a high-side switch M1 and a low-side switch M2. The high-side switch M1 is connected to an input voltage VIN. The switches M1 and M2 are driven by a corresponding pulse width modulation (PWM) signal. The PWM signals of all the phases are interleaved to charge an output capacitor C1 to develop an output voltage VOUT.

In the example of FIG. 1, a regulator block 110 has a corresponding transformer whose primary winding serves as an output inductor of the regulator block 110. For example, referring to the regulator block 110-1, the transformer T1 has a primary winding with a first end that is connected to a switch node of the switches M1 and M2 and a second end that is connected to the output voltage VOUT. The secondary winding of the transformer T1 is connected in series with the secondary windings of the transformers T2, T3, and T4 of the regulator blocks 110-2, 110-3, and 110-4, respectively. A compensation inductor Lc is connected in series with the secondary windings of the transformers T1, T2, T3, and T4. The compensation inductor loop (i.e., the series-connected compensation inductor Lc and the secondary windings of transformers T1, T2, T3, and T4) is grounded. Each transformer may have a primary to secondary turns ratio of 1:1, for example.

In one embodiment, the compensation inductor Lc is nonlinear in that it does not have a constant inductance throughout its operating region in the TLVR circuit 100; the inductance of the compensation inductor Lc varies depending on load condition. More particularly, the compensation inductor Lc is configured to have an inductance that is large when the compensation inductor current (i.e., current through the compensation inductor Lc) is low and an inductance that is small when the compensation inductor current is high. The compensation inductor current is typically low during load steady state conditions (i.e., when the current drawn by the load is non-varying at a stable level) and high during load transient conditions. A load transient condition occurs when there is a sudden increase in current demanded by the load. By increasing the inductance of the compensation inductor Lc when the compensation inductor current is low, the ripple on the output voltage VOUT is reduced when the load current is at steady state. By reducing the inductance of the compensation inductor Lc when the compensation inductor current is high, the TLVR circuit 100 is able to respond faster to load transient conditions.

In the example of FIG. 1, the TLVR circuit 100 is depicted as having a single primary winding and a single secondary winding for illustration purposes. As can be appreciated, embodiments of the present invention are also applicable to TLVR circuits with different numbers of transformer windings.

Figure 2:
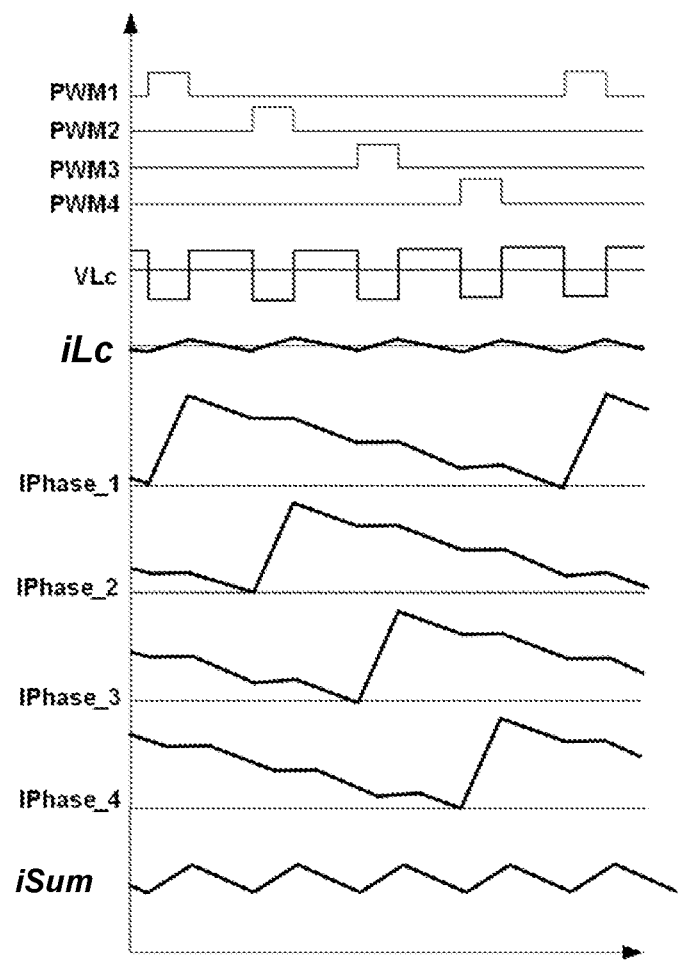
FIG. 2 shows a timing diagram of signals of the TLVR circuit of FIG. 1 during load steady state conditions in accordance with an embodiment of the present invention.

FIG. 2 shows a timing diagram of signals of the TLVR circuit 100 during load steady state condition in accordance with an embodiment of the present invention.

FIG. 2 shows, from top to bottom, the signal PWM1 (i.e., PWM signal driving the regulator block 110-1), signal PWM2 (i.e., PWM signal driving the regulator block 110-2), signal PWM3 (i.e., PWM signal driving the regulator block 110-3), signal PWM4 (i.e., PWM signal driving the regulator block 110-4), compensation inductor voltage VLc, compensation inductor current iLc, current iPhase1 (i.e., output current of the regulator block 110-1), current iPhase2 (i.e., output current of the regulator block 110-2), current iPhase3 (i.e., output current of the regulator block 110-3), current iPhase4 (i.e., output current of the regulator block 110-4), and a current iSum. The current iSum is the sum of currents iPhase1, iPhase2, iPhase3, and iPhase4. In general, the high-frequency current ripple on each of the phases adds up and is reflected on the output voltage VOUT because all of the phases are in series.

Figure 3:
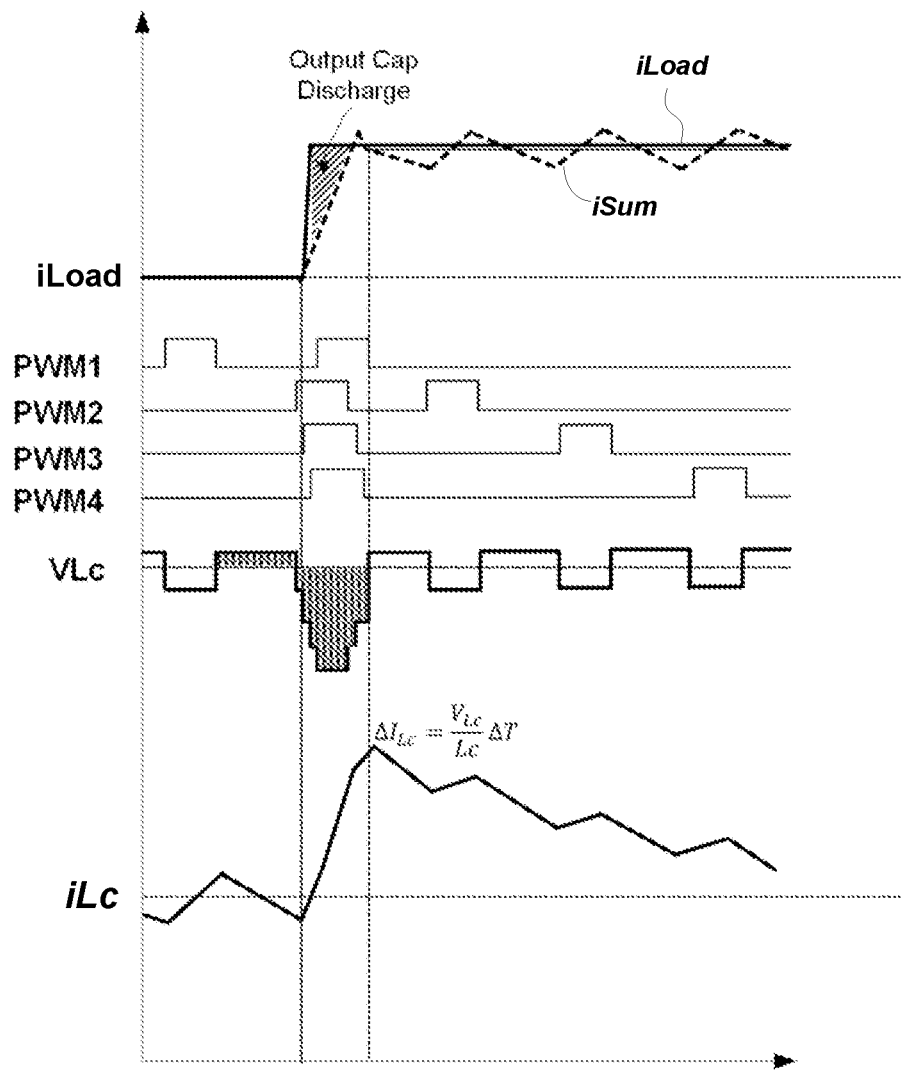
FIG. 3 shows a timing diagram of signals of a typical TLVR circuit during load transient conditions when the compensation inductor has a constant inductance throughout its operating region.

FIG. 3 shows a timing diagram of signals of a typical TLVR circuit during load transient conditions. In the example of FIG. 3, the TLVR circuit is the same as the TLVR circuit 100 except with a compensation inductor that has a constant inductance throughout its operating region. FIG. 3 shows, from top to bottom, a current iSum superimposed on a load current iLoad (i.e., current drawn by a load from the TLVR circuit), a signal PWM1 driving a first phase regulator block, a signal PWM2 driving a second phase regulator block, a signal PWM3 driving a third phase regulator block, a signal PWM4 driving a fourth phase regulator block, a compensation inductor voltage VLc, and a compensation inductor current iLc.

A load transient condition occurs when the load current iLoad increases at a high rate. To maintain the output voltage VOUT at the regulated level, a TLVR circuit responds by increasing the duty cycle of the PWM signals driving the regulator blocks. The increased duty cycle is reflected in the secondary windings of the transformers, thereby causing the compensation inductor current iLc to increase. With a compensation inductor that has a constant inductance Lc throughout its operating region, choosing a small inductance Lc will result in faster slew rate of the current iSum during transient conditions, thus providing faster transient response at the cost of increasing the steady-state ripple of the current iSum and the output voltage. On the other hand, choosing a large inductance Lc will result in smaller output voltage ripple but with slower transient response.

Figure 4:
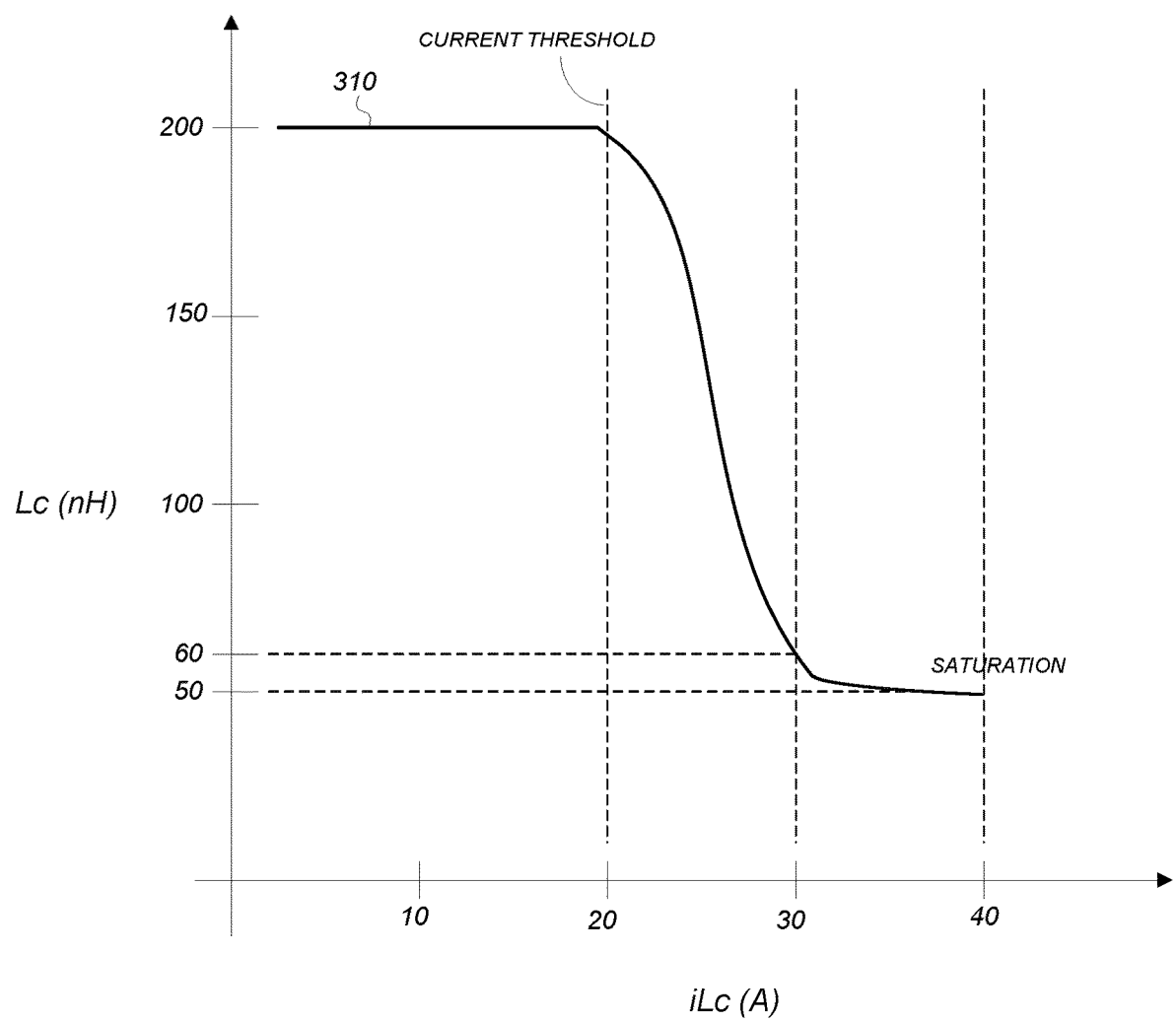
FIGS. 4-7 show inductance profiles of nonlinear compensation inductors in accordance with embodiments of the present invention.

FIG. 4 shows an inductance profile 310 of the compensation inductor Lc in accordance with an embodiment of the present invention. In the example of FIG. 4, the vertical axis indicates inductance Lc of the compensation inductor Lc in nano Henry (nH) and the horizontal axis indicates the compensation inductor current iLc in Amp (A). The inductance Lc may be configured to be a large inductance up to a current threshold and to decrease sharply after the current threshold. In the example of FIG. 4, the inductance Lc is at least 200 nH from zero to a current threshold of about 20 A. Past the current threshold, the inductance Lc sharply decreases to about 50-60 nH at 30 A up to saturation current.

Figure 5:
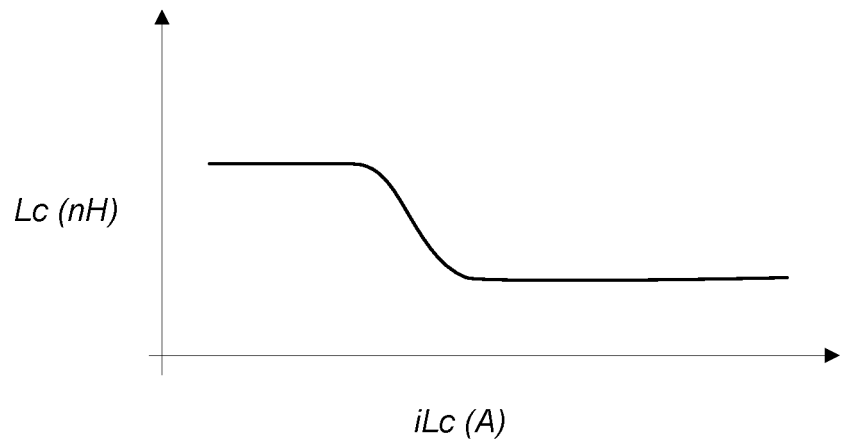
Figure 6:
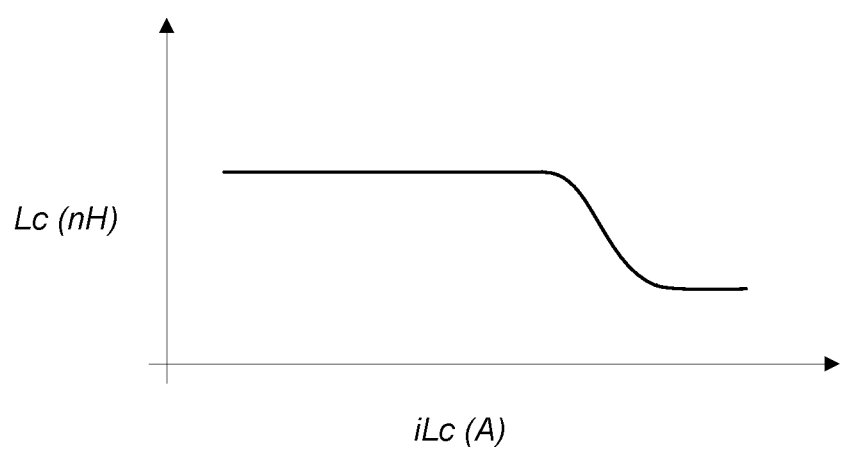

The inductance profile 310 is provided for illustration purposes only. In light of the present disclosure, it can be appreciated that the inductance profile of a compensation inductor may be configured to meet the needs of a particular TLVR circuit. For example, the inductance Lc may be configured to decrease sharply at a lower compensation inductor current iLc as illustrated in FIG. 5 (e.g., at a current threshold of 10 A) or at higher compensation inductor current iLc (e.g., at a current threshold of 30 A) as illustrated in FIG. 6.

Figure 7:
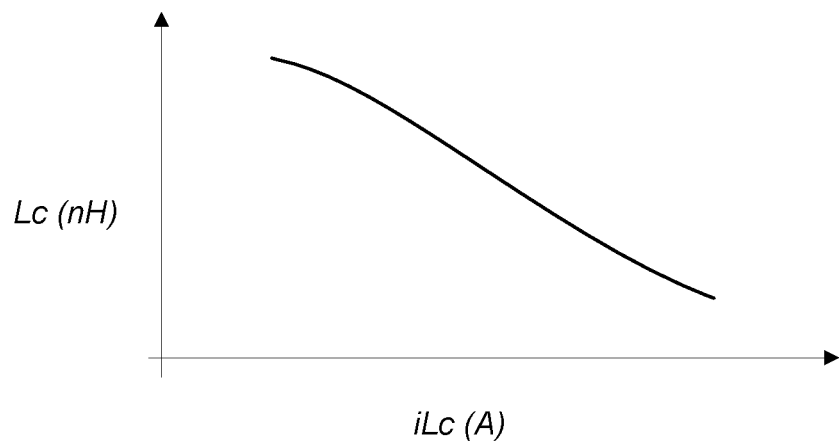

In some embodiments, the compensation inductor Lc has a linear inductance profile as illustrated in FIG. 7. In the example of FIG. 7, "linear" refers to the shape of the inductance profile. As can be appreciated, a nonlinear compensation inductor in a TLVR circuit may have a linear inductance profile by having varying inductance depending on load condition.

In general, the inductance Lc and the compensation inductor current iLc have a negative correlation, so that the inductance Lc is large when the compensation inductor current iLc is responsive to a steady state load current (i.e., low inductor current iLc) and the inductance Lc is small when the compensation inductor current iLc is responsive to a transient load current (i.e., high inductor current iLc). For example, the inductance Lc at steady state load current may be at least three times larger than the inductance Lc at transient load current. In some embodiments, the inductance Lc at steady state load current may be two times or 1.5 times larger than the inductance Lc at transient load current.

The inductance profile of the compensation inductor Lc may be configured by using a suitable magnetic core. For example, instead of using a magnetic core made of ferrites, a magnetic core made of powdered-iron, hybrid material, multiple magnetic core parts of different materials, etc., may be employed to shape the inductance profile of the compensation inductor Lc. Generally speaking, an inductor vendor can shape the inductance profile of a compensation inductor in accordance with the present disclosure using various techniques without detracting from the merits of the present invention.

Figure 8:
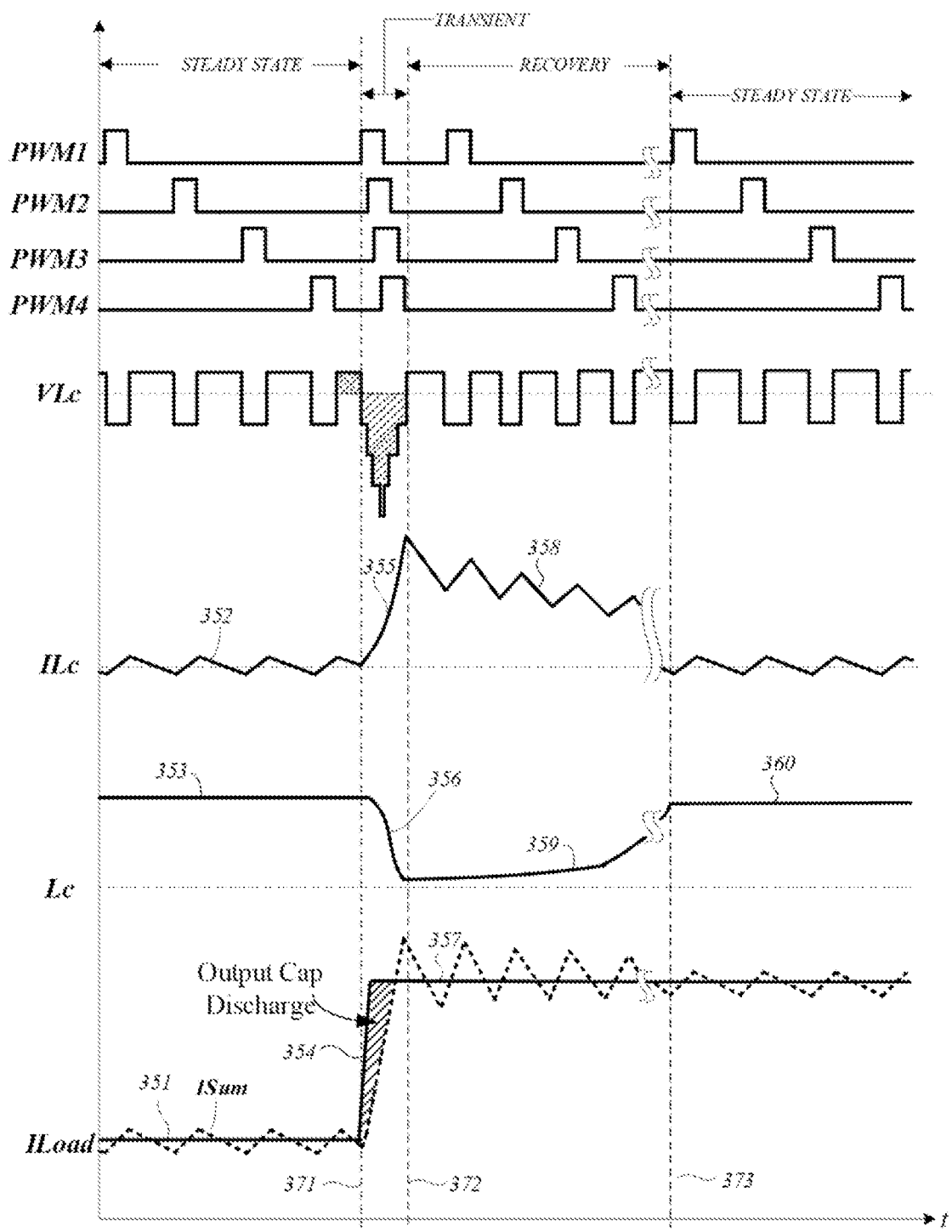
FIG. 8 shows a timing diagram of signals of the TLVR circuit of FIG. 1 in accordance with an embodiment of the present invention.

FIG. 8 shows a timing diagram of signals of the TLVR circuit 100 in accordance with an embodiment of the present invention. FIG. 8 shows, from top to bottom, the signal PWM1, the signal PWM2, the signal PWM3, the signal PWM4, the compensation inductor voltage VLc, the compensation inductor current iLc, the inductance Lc of the compensation inductor Lc, and the current iSum superimposed on the load current iLoad.

Prior to a time point 371, the load current iLoad is at steady state (see 351). Accordingly, the responsive compensation inductor current iLc is small (see 352), which causes the inductance Lc to be large (see 353), thereby minimizing the compensation inductor current iLc and the current iSum ripple. At the time point 371, a load transient condition occurs when the load current iLoad increases at a high rate (see 354). In response, the compensation inductor current iLc increases (see 355). The inductance Lc decreases sharply (see 356) when the compensation inductor current iLc increases to a current threshold. The decreased inductance Lc allows the TLVR circuit 100 to rapidly respond to the load transient condition. At a time point 372, the load current iLoad and the current iSum start to recover towards steady state (see 357), which causes the compensation inductor current iLc to decrease (see 358). The inductance Lc increases (see 359) when the compensation inductor current iLc decreases below the current threshold. The inductance Lc eventually increases to a large value (see 360) at load steady state (see time point 373), thereby minimizing ripple on the output voltage.

A TLVR circuit with nonlinear compensation inductor has been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A trans-inductor voltage regulator (TLVR) circuit comprising:
   a plurality of transformers, each of the plurality of transformers comprising a first winding and a second winding, the second windings of the plurality of transformers being connected in series;
   a plurality of regulator blocks that each provides a phase of the TLVR circuit, each of the regulator blocks being connected to an output capacitor of the TLVR circuit by way of an output inductor, the output inductor being a first winding of a transformer of the plurality of transformers; and
   a nonlinear compensation inductor that is connected in series with the second windings of the plurality of transformers, the nonlinear compensation inductor having a first inductance when a compensation inductor current flowing through the compensation inductor is responsive to a steady state condition of a load current provided by the TLVR circuit to a load and having a second inductance when the compensation inductor current is responsive to a transient condition of the load current, wherein the first inductance is larger than the second inductance.

2. The TLVR circuit of claim 1, wherein the nonlinear compensation inductor has a magnetic core that is made of powdered-iron.

3. The TLVR circuit of claim 1, wherein each of the regulator blocks comprises:
   a high-side switch and a low-side switch, a switch node between the high-side switch and the low-side switch being connected to a first end of a first winding of a transformer of the plurality of transformers, and a second end of the first winding of the transformer of the plurality of transformers being connected to the output capacitor.

4. The TLVR circuit of claim 3, wherein the high-side switch is connected to an input voltage.

5. The TLVR circuit of claim 1, wherein a series-connection of the second windings of the plurality of transformers has a first end that is connected to ground and a second end that is connected to a first end of the nonlinear compensation inductor, and
   wherein a second end of the nonlinear compensation inductor is connected to ground.

6. The TLVR circuit of claim 1, wherein the nonlinear compensation inductor has an inductance profile with an inductance that is at least 200 nH when the compensation inductor current is below 20 A and an inductance that is smaller than 60 nH when the compensation inductor current is greater than 30 A.

7. A trans-inductor voltage regulator (TLVR) circuit comprising:
   a first regulator block of a first phase of the TLVR circuit, the first regulator block comprising a high-side switch that is connected to an input voltage, a low-side switch that forms a switch node with the high-side switch of the first regulator block, wherein the switch node of the first regulator block is connected to an output voltage of the TLVR circuit by way of a first winding of a first transformer;
   a second regulator block of a second phase of the TLVR circuit, the second regulator block comprising a high-side switch that is connected to the input voltage, a low-side switch that forms a switch node with the high-side switch of the second regulator block, wherein the switch node of the second regulator block is connected to the output voltage of the TLVR circuit by way of a first winding of a second transformer; and
   a nonlinear compensation inductor that is connected in series with a second winding of the first transformer and a second winding of the second transformer, the nonlinear compensation inductor having a first inductance when a compensation inductor current flowing through the compensation inductor is responsive to a steady state condition load current and having a second inductance when the compensation inductor current is responsive to a transient load current, wherein the first inductance is at least three times larger than the second inductance.

8. The TLVR circuit of claim 7, wherein the nonlinear compensation inductor has an inductance profile with an inductance that is at least 200 nH at the steady state load current.

9. The TLVR circuit of claim 7, wherein the nonlinear compensation inductor has an inductance profile with an inductance that is at least 200 nH when the compensation inductor current is below 20 A and an inductance that is smaller than 60 nH when the compensation inductor current is greater than 30 A.

10. The TLVR circuit of claim 7, further comprising:
    a third regulator block of a third phase of the TLVR circuit, the third regulator block comprising a high-side switch that is connected to the input voltage, a low-side switch that forms a switch node with the high-side switch of the third regulator block, wherein the switch node of the third regulator block is connected to the output voltage of the TLVR circuit by way of a first winding of a third transformer; and
    a fourth regulator block of a fourth phase of the TLVR circuit, the fourth regulator block comprising a high-side switch that is connected to the input voltage, a low-side switch that forms a switch node with the high-side switch of the fourth regulator block, wherein the switch node of the fourth regulator block is connected to the output voltage of the TLVR circuit by way of a first winding of a fourth transformer,
    wherein the nonlinear compensation inductor is connected in series with the second winding of the first transformer, the second winding of the second transformer, a second winding of the third transformer, and a second winding of the fourth transformer.

11. The TLVR circuit of claim 10, wherein the nonlinear compensation inductor has a magnetic core that is made of powdered-iron.

* * * * *